May 15, 1951
E. T. RACHELS
2,552,734
STOCK LOADING CHUTE GATE
Filed Jan. 7, 1949
2 Sheets-Sheet 2
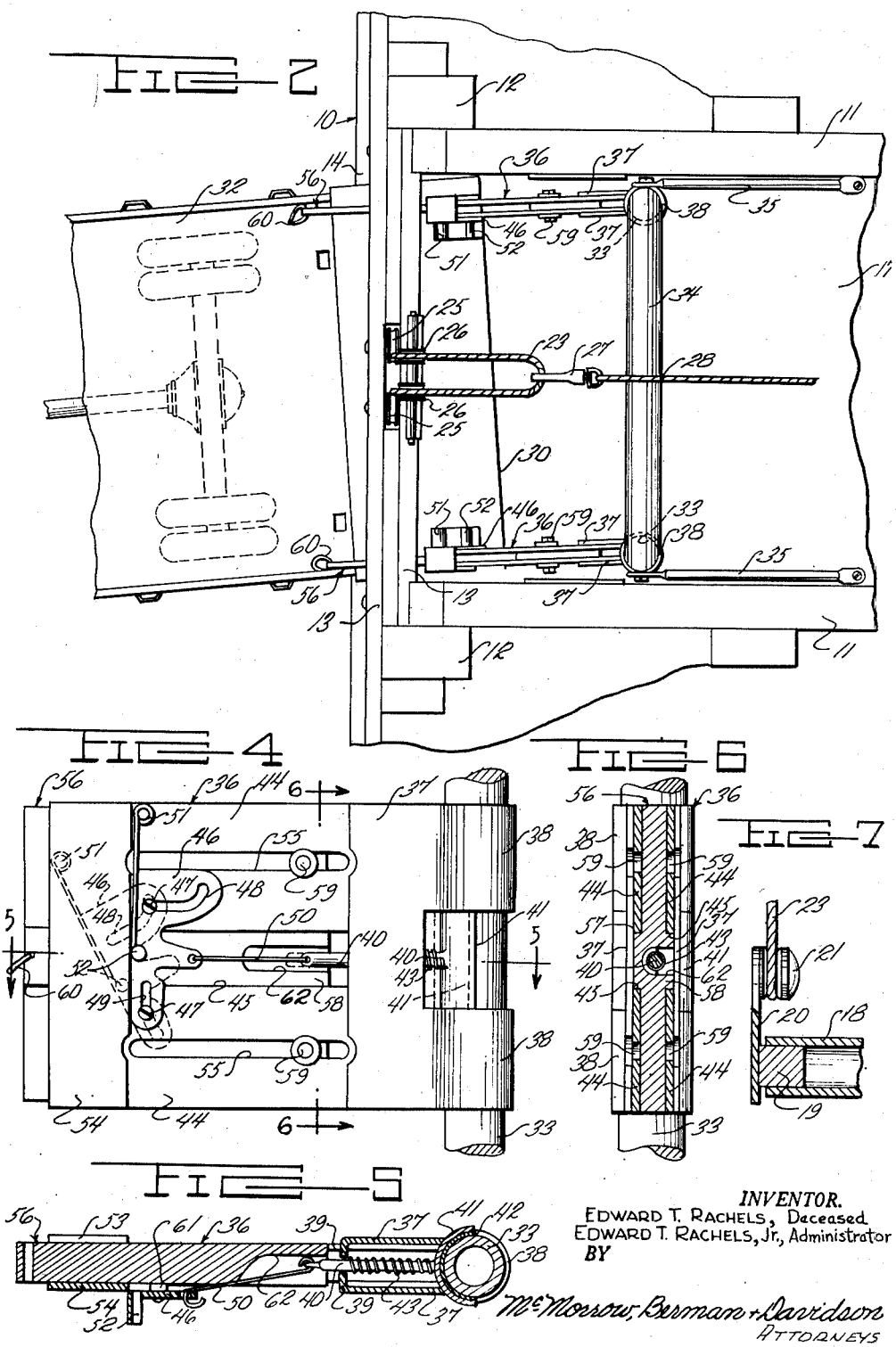
INVENTOR.
EDWARD T. RACHELS, Deceased
EDWARD T. RACHELS, Jr., Administrator
BY
McMorrow, Berman + Davidson
ATTORNEYS Patented May 15, 1951

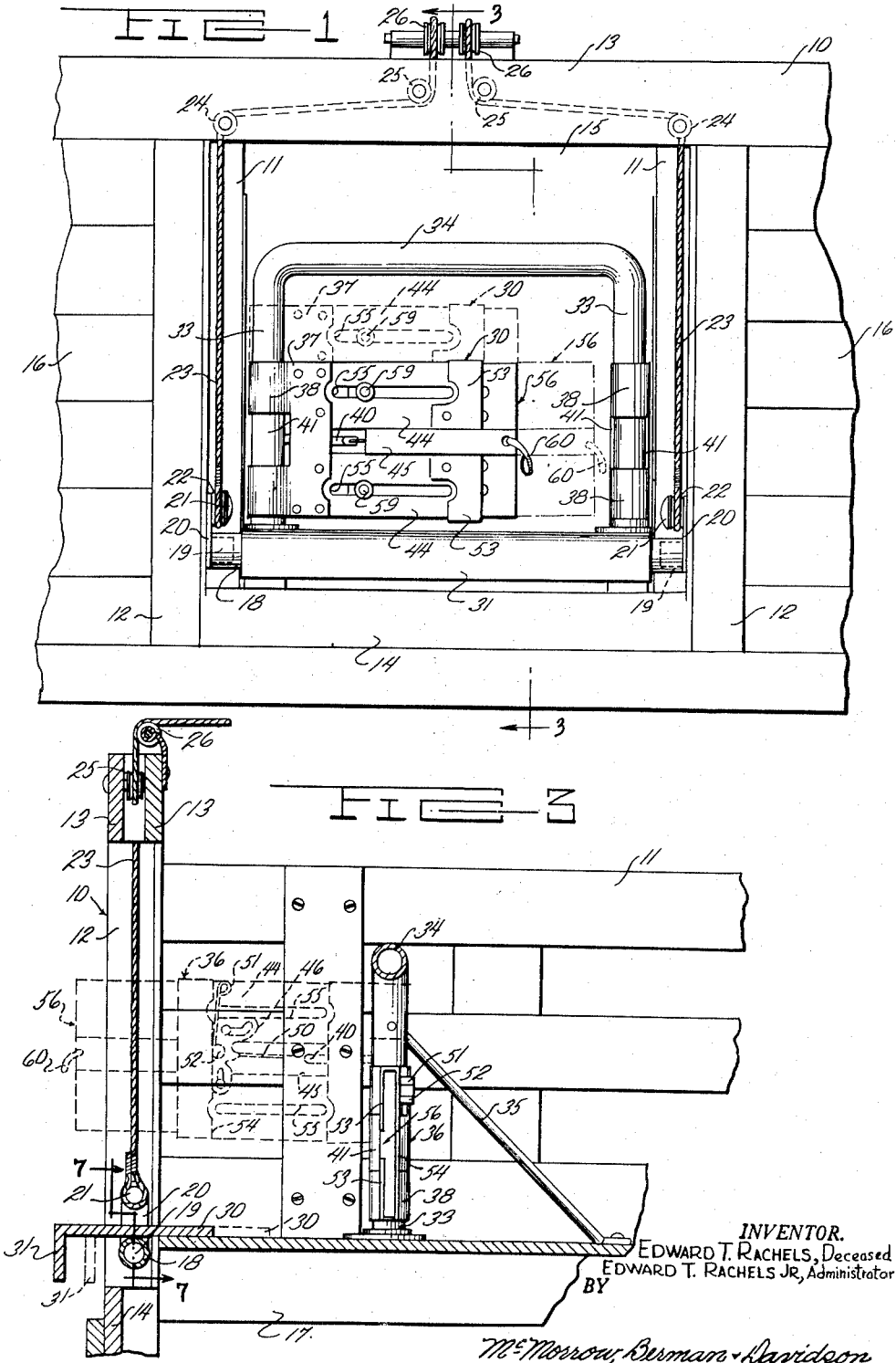

2,552,734

UNITED STATES PATENT OFFICE 2,552,734

STOCK LOADING CHUTE GATE

Edward T. Rachels, deceased, late of Cordele, Ga., by Edward T. Rachels, Jr., administrator, Cordele, Ga.

Application January 7, 1949, Serial No. 69,782

4 Claims. (Cl. 119—82)

This invention relates to chutes for the loading and unloading of livestock, and the device according to the invention comprises an improvement over the invention disclosed in the co-pending application, Serial No. 41,616, filed July 30, 1948, now matured into Patent No. 2,517,348, issued August 1, 1950. As in the copending application aforesaid, the invention is particularly adapted for the loading and unloading of stock to and from motor trucks.

With the foregoing in view, it is an object of this invention to provide an improved loading chute of the class described.

A further object is to provide in an improved loading chute of the class described improved gates for providing supplemental side walls for the chute whereby to guide the livestock to and from the vehicle being loaded or unloaded.

A further object is to provide an improved gate for a loading chute of the class described, which gate is adjustable vertically to position the same at selected heights above the chute floor, and which gate includes means for releasably holding the gate in a selected vertically-adjusted position.

A further object is to provide an improved gate such as that last described which includes means for extending the gate longitudinally to increase the length thereof.

A further object is to provide in a gate of the class described novel means mounting an extension on said gate for sliding movement to and from extended and retracted positions.

A further object is to provide in a gate of the class described novel means mounting the gate for horizontal pivoting and vertical sliding relative to a gate post, and improved brake means for locking the gate in a selected pivoted and/or vertically-adjusted position.

Other objects and advantages reside in the particular structure of the invention, combination and arrangement of the several parts thereof, and will be readily understood by those skilled in the art upon reference to the attached drawings in connection with the following specification, wherein the invention is shown, described and claimed.

In the drawings:

Figure 1 is a front view of the chute according to the invention, non-essential portions being broken away;

Figure 2 is a plan view thereof;

Figure 3 is a longitudinal vertical sectional view taken substantially on the planes of the line 3—3 of Figure 1;

Figure 4 is an enlarged elevational view of one of the gates according to the invention apart from the rest of the structure;

Figure 5 is a horizontal sectional view taken substantially on the plane of the line 5—5 of Figure 4;

Figure 6 is a vertical sectional view taken substantially on the plane of the line 6—6 of Figure 4;

Figure 7 is an enlarged fragmentary vertical sectional view taken substantially on the planes of the line 7—7 of Figure 3.

Referring specifically to the drawings, wherein like reference characters have been used throughout the several views to designate like parts, and referring at first to those portions of the instant invention substantially corresponding to like portions of the copending application aforesaid, 10 designates generally a sturdy, rigid frame for the chute. The frame 10 includes a pair of rigid side walls 11 for the chute. The front edges of the walls 11 terminate just inwardly of a pair of vertical posts 12, which, together with a horizontally-disposed over-head frame member 13 and a sill 14 define a chute opening 15. It is understood that the chute opening 15 is at least as wide as the widest opening of a vehicle with which the chute is adapted to be used, and that the height of the opening is at least as great as that of the tallest or most elevated opening of a vehicle adapted for use with the chute. Moreover, it should be understood that the sill 14 is located substantially lower than the lowest body of a vehicle adapted to use the chute. The frame 10 includes any suitable wall portion 16 on opposite sides of the opening 15. The chute also includes a vertically-adjustable floor 17, the rear end of which, not shown, is mounted as in the copending application, and the front end of which is defined by a tubular pipe 18, the open ends of which provide journals for a pair of cylindrical stub shafts 19, best seen in Figures 1 and 7. The outer ends of the pipe 18 are vertically slidable in the angular spaces provided between the front end edges of the walls 11 and the inner faces of the posts 12. The outer ends of the stub shafts 19 have fixed thereto vertically-directed plates or arms 20, the upper ends of which are formed with inwardly-directed bosses 21, the peripheries of which are formed with annular grooves 22 rotatably seating eyes formed on the free ends of a hoisting cable 23. The ends of the cable 23 extend upwardly over sheaves 24 and 25 mounted in the head 13 for the opening 15, and thence upwardly and rearwardly over sheaves 26 mounted atop the head 13. As best seen in Figure 2, the bight of the cable 23 is connected by any suitable universal coupling 27 to a second cable 28 which extends rearwardly above the chute to any suitable drum, not shown, for winding the same thereon. Thus, as the cable 28 is wound onto the drum, the chute floor 17 is raised so as to position the same level with the floor of a vehicle loading or unloading at the chute.

The front edge of the floor 17 has slidable thereon a plate 30 which includes a front end extending beyond the pipe 18 and which is downwardly directed, as at 31, to provide a buffer. As in the copending application aforesaid, the plate 30 is mounted for longitudinal sliding movement relative to the floor 17 and also for lateral tilting movement, whereby the plate is adapted to be self aligning with the rear edge of the floor of any typical vehicle 32, Figure 2, backing thereagainst. Suitable springs, not shown, load the plate and buffer 31 forwardly to the full line position of Figure 3. However, upon impact with the vehicle 32, the plate 30 and buffer 31 are moved backward to the broken line position of Figure 3 and may well be laterally tilted, as shown in full lines in Figure 2. Thus, no space is provided between the floor of the vehicle and the front edge of the floor 17, even though the vehicle 32 is not backed squarely against the front edge of the floor 17.

As so far described, the device of the invention is substantially similar to and functions in the same manner as does the device of the copending application aforesaid. However, it will be obvious that certain of the above-described structural details, such as the arrangement of the hoist for the floor 17 and the connection to the pipe 18 differ from such application. However, in the copending application, when a vehicle smaller than the lateral dimensions of the opening 18 was backed against a chute, there was provided laterally-sliding closures for the opening 15 to close the space on one or both sides of the vehicle and the posts 12. Such closures and/or gates have been omitted in this invention, and the structure now to be described substituted therefor.

Thus, a pair of vertically-disposed cylindrical gate posts 33 are rigidly mounted on the floor 17 of the chute in any suitable manner in inset relation to the side and front edges of the chute floor. The posts 33 are mounted sufficiently close to the walls 11 as to prevent the passage of an animal therebetween and also to provide clearance between the posts and the walls 11, as the posts are raised and lowered with the floor 17. The upper ends of the posts are connected together by any suitable stringer 34 which is preferably integral with the posts. Rearwardly-directed braces 35 are secured to the upper ends of the posts and to the floor 17 in any suitable manner to prevent displacement of the posts. The purpose of the stringer 34 which is substantially heavy duty is to protect gates to be described hereinafter in the event that an animal tries to leap the gates and lands atop the same. Thus, the stringer 34 is sufficiently high to permit the passage thereunder of the largest type of animal with which the gates are adapted to be used, but is also sufficiently low to provide insufficient space between the tops of the gates and the stringer to permit the passage of an animal therethrough.

Such gates are two in number and are generally designated by the reference character 36. In view of the fact that the gates 36 are substantially identical, it will suffice to described but a single one of them. Thus, one side of the gate is indicated in Figure 1, while the opposite side is indicated on a slightly enlarged scale in Figure 4. Each gate 36 includes a rear end which is rigidly secured between a pair of side plates 37 which include rearwardly-directed upper and lower portions formed to provide tubular sleeves 38 freely slidable and pivotable on the posts 33. The plates 37 are secured to the rear ends of the gates 36 in any suitable manner so as to form integral portions of such rear ends.

As best seen in Figure 5, forward central portions of the plates 37 are inwardly directed, as at 39, and notched to provide a substantially circular aperture for the sliding passage therethrough of a brake pin 40. The pin 40 extends rearwardly toward the adjacent post 33 and its rear end is formed with an arcuate brake shoe 41 which may be provided on its rear surface with any suitable brake lining 42. The brake lining 42 and shoe 41 are substantially complementary to the posts 33 and occupy the space between the sleeves 38. Any suitable brake spring 43 is operatively disposed about the pin 40 with its opposite ends bearing on the inturned portions 39 and on the shoe 41, whereby to load the brake shoe and brake lining into setting engagement with the adjacent post 33. Thus, the brake shoe and lining provide a spring biased brake shoe for holding the gate 36 in a selected adjusted position relative to the post 33. In this connection, it should be noted that the gates 36 are vertically slidable on the posts 33, as illustrated in broken lines in Figures 1 and 3. The purpose of this arrangement is to provide clearances for the bottom edges of the gate when a vehicle having a relatively thick tail gate or the like uses the chute, and it is desired to position the lower edges of the gate above the plane of such tail gate. Likewise, it is desirable at times to elevate the gates 36 to the maximum height when utilized for loading and unloading larger animals, while it may be desirable to lower the gates to a minimum height when utilizing the gates with smaller animals which might otherwise escape below the gates. Thus, the brakes are effective to hold the gates in vertically-adjusted positions and are also effective to hold the gates in pivotally-adjusted positions. At the same time, an operator of the gates is able to swing the gates and/or slide the same vertically if necesary, while the brakes are set. Moreover, means now to be described have been provided for releasably locking the brakes in a released position permitting free pivoting and vertical sliding of the gates relative to the posts 33.

The body of the gate comprises upper and lower pairs of laterally-spaced panels 44 providing slots 45 therebetween. The slots 45 are aligned with the space between the sleeves 38 and the forward end of the brake rod 40 extends into such slot. The upper and lower panels 44 at one side of the gate have a latch 46 secured thereto in any suitable manner, as by the pins 47. The latch 46 is provided with a bayonet slot 48 slidably receiving the uppermost pin 47, while a lower portion of the latch is provided with a normally vertically-disposed slot 49 slidably and pivotally receiving the lowermost pin 47. A link 50 connects the latch 46 to the brake rod 40, the link 50 being diagonally laterally directed to extend outwardly through the adjacent slot 45. The latch 46 includes upper and lower laterally-directed finger pieces or hand grips 51 and 52, respectively, for actuation of the latch. With the parts in the full line position of Figure 4, the uppermost pin 47 is seated in the horizontal portion of the bayonet slot 48, while the lowermost pin 47 is seated in the bottom of the lower slot 49. However, if the uppermost finger piece 51 is grasped and the latch is pivoted thereby in a counterclockwise direction, the pin 47 will be seated in the vertical portion of the bayonet slot 48, whereby to retain the latch 46 in the broken line position. The effect of this movement is to pull the brake shoe 41 and lining 42 thereof out of setting engagement with the related post 33 to a released position. To reset the brakes, it is only necessary for the operator to grasp the lower finger piece 52 and raise the latch 46 sufficiently to disengage the uppermost pin 47 from the vertical portion of the bayonet slot 48. Thereafter, the brake spring 43 will move the latch 46 to the full line position of Figure 4 and permit setting of the brake shoes.

The front ends of the panels 44 are connected together by a reinforcing plate 54, the upper and lower ends of which are formed to overlie the upper and lower edges of the front ends of the panels 44 and are then respectively downwardly and upwardly directed, as at 53, Figure 3, so that each pair of panels 44 is laterally spaced and the pairs of panels are vertically spaced to provide the slots 45 aforesaid. The free ends of the portions 53 are spaced apart a distance corresponding to the height of the slot 45 at one side of the gate and in alignment with opposite edges of such slot. Likewise, it should be noted that each panel 44 is provided with a horizontally-disposed slot 55, the purpose of which will be apparent hereinafter. The narrow vertical space between the upper and lower panels of each pair provide a housing in the gate for a gate extension now to be described.

Such extension is generally indicated at 56, and comprises a heavy plate-like panel having a close sliding fit between the laterally-spaced panels 44. The panel or extension 56 is formed with a pair of horizontally-disposed and laterally-directed runners 57 and 58 which have a close sliding fit in the slots 45 aforesaid. The extension 56 likewise is provided with a plurality of laterally-directed headed pins or the like 59 which slidably guide and assist in supporting the same in the slots 55 aforesaid. Thus, the extension 56 is relatively rigidly supported for telescopic sliding or extensile and contractile movement relative to the gate 36 to and from a retracted position inwardly of the gate and an extended position wherein the length of the gates is substantially doubled. Obviously, the extensions 56 may be set at any intermediate point from the fully extended to the fully retracted positions. As clearly shown in Figure 2, the extensions 56 are adapted to be projected forwardly into the vehicle and then swung outwardly to abut opposite sides of the rear end of vehicle 32 to prevent lateral escape of livestock as they pass to or from the interior of the vehicle. Any suitable means, such as the loops 60, may be secured to the forward end edges of the extensions 56 for advancing the same. As best seen in Figure 5, the latch 46 is spaced outwardly from the panels 44 to which it is connected by spacing washers 61, so as to clear the reinforcement 54 and permit forward swinging of the latch. Likewise, one side of the extension 56 adjacent the rear edge thereof is cut away, as at 62, to provide clearance for the link 50.

In operation, the normal position of the gates 36 is in a rearwardly-swung position rearwardly of the gate posts 33. To prevent accidental engagement of the gates with the walls 11 while the floor 17 is being raised and lowered, the braces 35 are so positioned as to provide stops limiting the rearward swinging of the gates. In this position, there is no possible danger of the gates being damaged by a projecting end of a vehicle backing against the front edge of the chute, nor can they be damaged by an elongated tail gate when the same is dropped inwardly through the opening 15 onto the floor of the chute. However, after said tail gate has dropped, the gates 36 may be elevated on the posts 33 if necessary and swung to the full line position of Figure 2. Thereafter, the extensions 56 may be extended, as shown, so as to engage opposite sides of the body of the vehicle 32. After a vehicle has been loaded, the position of the gates and their extensions is such that they are out of the way of any type of closure for the vehicle body so that the same may be promptly closed without moving the gates or extensions substantially. Thereafter, the extensions may be moved to the retracted position and the gates moved to their inoperative position against the braces 35.

While what has been shown and described is now thought to be a preferred embodiment of the invention, it is to be understood that the same is susceptible of other forms and expressions. Consequently, this invention is not limited to the precise structure shown and described hereinabove except as hereinafter claimed.

The claimed invention is:

1. In a gate structure for a stock loading chute including a floor, a pair of vertically disposed posts arranged in parallel spaced relation and fixedly secured to said floor intermediate the ends of the latter, a vertically disposed gate positioned adjacent to each of said posts and having one end connected to the adjacent post for vertical sliding movement and for swinging movement about said post, and a spring biased brake shoe operatively connected to each of said gates and normally engageable with the adjacent post for holding each of said gates in any selected position of its sliding and swinging movements.

2. In a gate structure for a stock loading chute including a floor, a pair of vertically disposed posts arranged in parallel spaced relation and fixedly secured to said floor intermediate the ends of the latter, a vertically disposed gate positioned adjacent to each of said posts and having one end connected to the adjacent post for vertical sliding movement and for swinging movement about said post, a spring biased brake shoe operatively connected to each of said gates and normally engageable with the adjacent post for holding each of said gates in any selected position of its sliding and swinging movements, and a manually actuable latch mechanism operatively connected to each of said brake shoes for shifting each of said shoes out of engagement with the adjacent post.

3. In a gate structure for a stock loading chute including a floor, a pair of vertically disposed posts arranged in parallel spaced relation and fixedly secured to said floor intermediate the ends of the latter, a vertically disposed gate positioned adjacent to each of said posts and having one end connected to the adjacent post for vertical sliding movement and for swinging movement about said post, a spring biased brake shoe operatively connected to each of said gates and normally engageable with the adjacent post for holding each of said gates in any selected position of its sliding and swinging movements, and a vertically disposed extension arranged adjacent the other end of each of said gates and connected to the adjacent gate for extensile and contractile movement.

4. In a gate structure for a stock loading chute including a floor, a pair of vertically disposed posts arranged in parallel spaced relation and fixedly secured to said floor intermediate the ends of the latter, a vertically disposed gate positioned adjacent to each of said posts and having one end connected to the adjacent post for vertical sliding movement and for swinging movement about said post, a spring biased brake shoe operatively connected to each of said gates and normally engageable with the adjacent post for holding each of said gates in any selected position of its sliding and swinging movements, a vertically disposed extension arranged adjacent the other end of each of said gates and connected to the adjacent gate for extensile and contractile movement, and a manually actuable latch mechanism operatively connected to each of said brake shoes for shifting each of said shoes out of engagement with the adjacent post.

EDWARD T. RACHELS, JR.,
*Administrator, Estate of Edward T. Rachels, Deceased.*

REFERENCES CITED

The following references are of record in the file of this patent:

UNITED STATES PATENTS

| Number | Name | Date |
|---|---|---|
| 127,961 | Cottle | June 18, 1872 |
| 332,802 | Hiveley | Dec. 22, 1885 |
| 409,222 | McIver et al. | Aug. 20, 1889 |
| 461,121 | Taylor | Oct. 13, 1891 |
| 492,002 | Frederick | Feb. 21, 1893 |
| 722,358 | Doen | Mar. 10, 1903 |
| 733,959 | Hallam | July 21, 1903 |
| 880,665 | Hopper | Mar. 3, 1908 |
| 1,089,523 | Barnett | Mar. 10, 1914 |
| 1,462,755 | Allred | July 24, 1923 |